US009946538B2

(12) United States Patent
Abdallah et al.

(10) Patent No.: US 9,946,538 B2
(45) Date of Patent: Apr. 17, 2018

(54) METHOD AND APPARATUS FOR PROVIDING HARDWARE SUPPORT FOR SELF-MODIFYING CODE

(71) Applicant: Intel Corporation, Santa Clara, CA (US)

(72) Inventors: Mohammad Abdallah, El Dorado Hills, CA (US); Karthikeyan Avudaiyappan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/710,372

(22) Filed: May 12, 2015

(65) Prior Publication Data

US 2015/0324213 A1 Nov. 12, 2015

Related U.S. Application Data

(60) Provisional application No. 61/991,951, filed on May 12, 2014.

(51) Int. Cl.
*G06F 9/30* (2018.01)
*G06F 9/455* (2018.01)

(52) U.S. Cl.
CPC ............ *G06F 9/30* (2013.01); *G06F 9/3017* (2013.01); *G06F 9/45525* (2013.01)

(58) Field of Classification Search
CPC ....... G06F 9/30; G06F 9/3017; G06F 9/45525
See application file for complete search history.

(56) References Cited

U.S. PATENT DOCUMENTS 5,053,952 A 10/1991 Koopman, Jr. et al.
5,386,583 A 1/1995 Hendricks
(Continued)

FOREIGN PATENT DOCUMENTS

CN 1841314 A 10/2006
EP 0638183 B1 3/1997
(Continued)

OTHER PUBLICATIONS

Bhansali et al.; "Framework for Instruction-Level Tracing and Analysis of Program Executions", In Proceedings of the 2nd International Conference on Virtual Execution Environments; Ottawa, Ontario, pp. 154-163 (Year: 2006).*

(Continued)

*Primary Examiner* — H. Sough
*Assistant Examiner* — Timothy P Duncan
(74) *Attorney, Agent, or Firm* — NDWE LLP

(57) ABSTRACT

A method and apparatus for providing support for self modifying guest code. The apparatus includes a memory, a hardware buffer, and a processor. The processor is configured to convert guest code to native code and store converted native code equivalent of the guest code into a code cache portion of the processor. The processor is further configured to maintain the hardware buffer configured for tracking respective locations of converted code in a code cache. The hardware buffer is updated based a respective access to a respective location in the memory associated with a respective location of converted code in the code cache. The processor is further configured to perform a request to modify a memory location after accessing the hardware buffer.

16 Claims, 6 Drawing Sheets

(56) References Cited

U.S. PATENT DOCUMENTS

| | | | |
|---|---|---|---|
| 5,651,124 A | 7/1997 | Shen et al. | |
| 5,729,766 A | 3/1998 | Cohen | |
| 5,751,982 A | 5/1998 | Morley | |
| 5,784,638 A | 7/1998 | Goetz et al. | |
| 5,826,055 A | 10/1998 | Wang et al. | |
| 5,826,073 A * | 10/1998 | Ben-Meir | G06F 9/30149 712/226 |
| 5,870,575 A | 2/1999 | Kahle et al. | |
| 5,870,584 A | 2/1999 | Bennett | |
| 5,905,876 A | 5/1999 | Pawlowski et al. | |
| 5,983,335 A | 11/1999 | Dwyer, III | |
| 6,049,868 A | 4/2000 | Panwar | |
| 6,052,777 A | 4/2000 | Panwar | |
| 6,061,785 A | 5/2000 | Chiarot et al. | |
| 6,167,508 A | 12/2000 | Farrell et al. | |
| 6,269,439 B1 | 7/2001 | Hanaki | |
| 6,360,311 B1 | 3/2002 | Zandveld et al. | |
| 6,385,676 B1 | 5/2002 | Adkisson | |
| 6,557,095 B1 | 4/2003 | Henstrom | |
| 6,711,672 B1 | 3/2004 | Agesen | |
| 6,779,092 B2 | 8/2004 | Watts | |
| 6,813,704 B1 | 11/2004 | Nguyen | |
| 6,851,011 B2 | 2/2005 | Lin | |
| 6,898,699 B2 | 5/2005 | Jourdan et al. | |
| 7,096,345 B1 | 8/2006 | Chen et al. | |
| 7,113,510 B2 | 9/2006 | Lin | |
| 7,127,592 B2 | 10/2006 | Abraham et al. | |
| 7,170,814 B2 | 1/2007 | Morikawa | |
| 7,315,935 B1 | 1/2008 | Alsup et al. | |
| 7,373,637 B2 | 5/2008 | DeWitt, Jr. et al. | |
| 7,434,031 B1 | 10/2008 | Spracklen et al. | |
| 7,644,210 B1 | 1/2010 | Banning et al. | |
| 7,647,589 B1 * | 1/2010 | Dobrovolskiy | G06F 11/3644 710/260 |
| 7,710,763 B2 | 5/2010 | Houston | |
| 7,716,460 B2 | 5/2010 | Stempel et al. | |
| 7,721,076 B2 | 5/2010 | Sodani et al. | |
| 7,783,869 B2 | 8/2010 | Grandou et al. | |
| 7,813,163 B2 | 10/2010 | Pille et al. | |
| 8,024,522 B1 | 9/2011 | Favor et al. | |
| 8,074,060 B2 | 12/2011 | Col et al. | |
| 8,195,922 B2 | 6/2012 | Chen et al. | |
| 8,219,784 B2 | 7/2012 | Ban et al. | |
| 8,238,192 B2 | 8/2012 | Nii | |
| 8,959,094 B2 | 2/2015 | Taylor | |
| 2002/0032852 A1 | 3/2002 | Ramirez et al. | |
| 2003/0101444 A1 | 5/2003 | Wu et al. | |
| 2003/0115578 A1 * | 6/2003 | Liokumovich | G06F 9/45558 717/138 |
| 2003/0163671 A1 | 8/2003 | Gschwind et al. | |
| 2004/0133766 A1 | 7/2004 | Abraham et al. | |
| 2006/0026408 A1 | 2/2006 | Morris et al. | |
| 2006/0242365 A1 | 10/2006 | Ali et al. | |
| 2007/0033385 A1 | 2/2007 | Smaus et al. | |
| 2007/0186081 A1 | 8/2007 | Chaudhry et al. | |
| 2007/0192541 A1 | 8/2007 | Balasubramonian et al. | |
| 2008/0028195 A1 | 1/2008 | Kissell et al. | |
| 2008/0126771 A1 | 5/2008 | Chen et al. | |
| 2008/0216073 A1 * | 9/2008 | Yates | G06F 9/30174 718/100 |
| 2009/0019261 A1 | 1/2009 | Nguyen et al. | |
| 2009/0049279 A1 | 2/2009 | Steiss et al. | |
| 2009/0103377 A1 | 4/2009 | Chang | |
| 2009/0164766 A1 | 6/2009 | Suggs et al. | |
| 2009/0182987 A1 | 7/2009 | Mejdrich et al. | |
| 2009/0210627 A1 | 8/2009 | Alexander et al. | |
| 2009/0254709 A1 | 10/2009 | Agesen | |
| 2010/0064287 A1 | 3/2010 | Bull et al. | |
| 2010/0097840 A1 | 4/2010 | Kim | |
| 2010/0131742 A1 | 5/2010 | Col et al. | |
| 2010/0153690 A1 | 6/2010 | Vick et al. | |
| 2010/0161948 A1 | 6/2010 | Abdallah | |
| 2010/0299671 A1 | 11/2010 | Kinsey | |
| 2010/0333090 A1 * | 12/2010 | Wright | G06F 9/45516 718/1 |
| 2011/0016292 A1 | 1/2011 | McDonald et al. | |
| 2011/0271055 A1 | 11/2011 | O'Connor | |
| 2011/0320784 A1 | 12/2011 | Almog et al. | |
| 2012/0117335 A1 | 5/2012 | Bryant | |
| 2012/0198122 A1 | 8/2012 | Abdallah | |
| 2012/0198157 A1 * | 8/2012 | Abdallah | G06F 12/0875 711/118 |
| 2012/0221747 A1 | 8/2012 | Mei et al. | |
| 2012/0246450 A1 | 9/2012 | Abdallah | |
| 2013/0086365 A1 | 4/2013 | Gschwind et al. | |
| 2014/0059262 A1 * | 2/2014 | Davis | G06F 9/4812 710/269 |
| 2014/0126278 A1 | 5/2014 | Nii et al. | |
| 2014/0281116 A1 | 9/2014 | Abdallah et al. | |
| 2014/0281388 A1 | 9/2014 | Abdallah | |
| 2014/0281422 A1 | 9/2014 | Abdallah et al. | |
| 2014/0282546 A1 | 9/2014 | Abdallah et al. | |
| 2014/0282575 A1 | 9/2014 | Chan | |
| 2014/0304492 A1 | 10/2014 | Abdallah et al. | |
| 2015/0023086 A1 | 1/2015 | Wendell | |
| 2015/0324213 A1 | 11/2015 | Abdallah et al. | |

FOREIGN PATENT DOCUMENTS

| | | |
|---|---|---|
| TW | 200719216 A | 5/2007 |
| TW | I329437 B | 8/2010 |
| TW | I368165 | 7/2012 |
| TW | I377502 B | 11/2012 |
| WO | 9322722 A1 | 11/1993 |
| WO | WO9737301 | 10/1997 |
| WO | 2004095264 A2 | 11/2004 |

OTHER PUBLICATIONS

Zhou Li, Fast Interconnect Synthesis With Layer Assignment. Apr. 2008.

Michael Slater, Microprocessor Report, The Insiders' Guide to Microprocessor Hardware, Oct. 1994, vol. 8.

International Preliminary Report on Patentability for Application No. PCT/US2015/030411, dated Nov. 24, 2016, 7 pages.

International Search Report and Written Opinion for Application No. PCT/US2015/030411, dated Jul. 21, 2015, 9 pages.

Extended European Search Report for Application No. 15792326.9, dated Dec. 22, 2017, 8 pages.

* cited by examiner

US 9,946,538 B2

METHOD AND APPARATUS FOR PROVIDING HARDWARE SUPPORT FOR SELF-MODIFYING CODE

CROSS REFERENCE TO RELATED APPLICATIONS

This Application claims the benefit of U.S. Provisional Application No. 61/991,951, filed May 12, 2014, which is hereby incorporated by reference.

BACKGROUND

Self modifying code (SMC) is an optimization technique where some software code modifies a part of itself before executing. SMC may be used in just-in-time compilation (JIT) compilation systems such as with the JAVA™ programming language. In systems that use code conversion, self modification of guest code presents a specific problem, as guest code modification (GCM) must be detected and corresponding converted traces in the code cache must be either invalidated or regenerated based on the new code.

Detection of GCM can be challenging because of corner cases that can occur. The corner cases can include code and writable data that are finely interleaved and for Harvard processors, for example having separate instruction and data paths, the GCM may require specific code sequences in guest architecture to make the code change visible if the code was stored in cacheable memory.

The corner cases can further include when code locations are written by memory masters different from a central processing unit (CPU). For example, some direct memory access (DMA) process downloads code from an external peripheral before executing the code. Oftentimes, an Input/Output Memory Management Unit (IOMMU) is present so that the DMA memory write operations are visible to the CPU and can be taken into account.

SUMMARY

A need exists to handle self modifying guest code and DMA modification of guest code, together known as GCM. Embodiments are configured for identifying changes to memory areas that correspond to traces of code stored in a code cache. Embodiments may further be configured for tracking locations of converted code in a code cache. Fetching of data where self modifying code may be present can be supported. Performance is enhanced while detection of self modifying code and replacement of traces of code in the code cache is performed.

An embodiment is implemented as an apparatus for providing support for self modifying code. The apparatus includes a memory, a hardware buffer, and a processor. The processor is configured to convert guest code to native code and store converted guest code into a code cache portion of the processor. The processor is further configured to maintain the hardware buffer configured for tracking respective locations of converted code in a code cache. The hardware buffer is updated based on a respective access to a respective location in the memory associated with a respective location of converted code in the code cache. The processor is further configured to perform a request to modify a memory location after accessing the hardware buffer.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Further aspects of the present disclosure will become apparent from the following description which is given by way of example only and with reference to the accompanying drawings in which.

DETAILED DESCRIPTION

Figure 1:
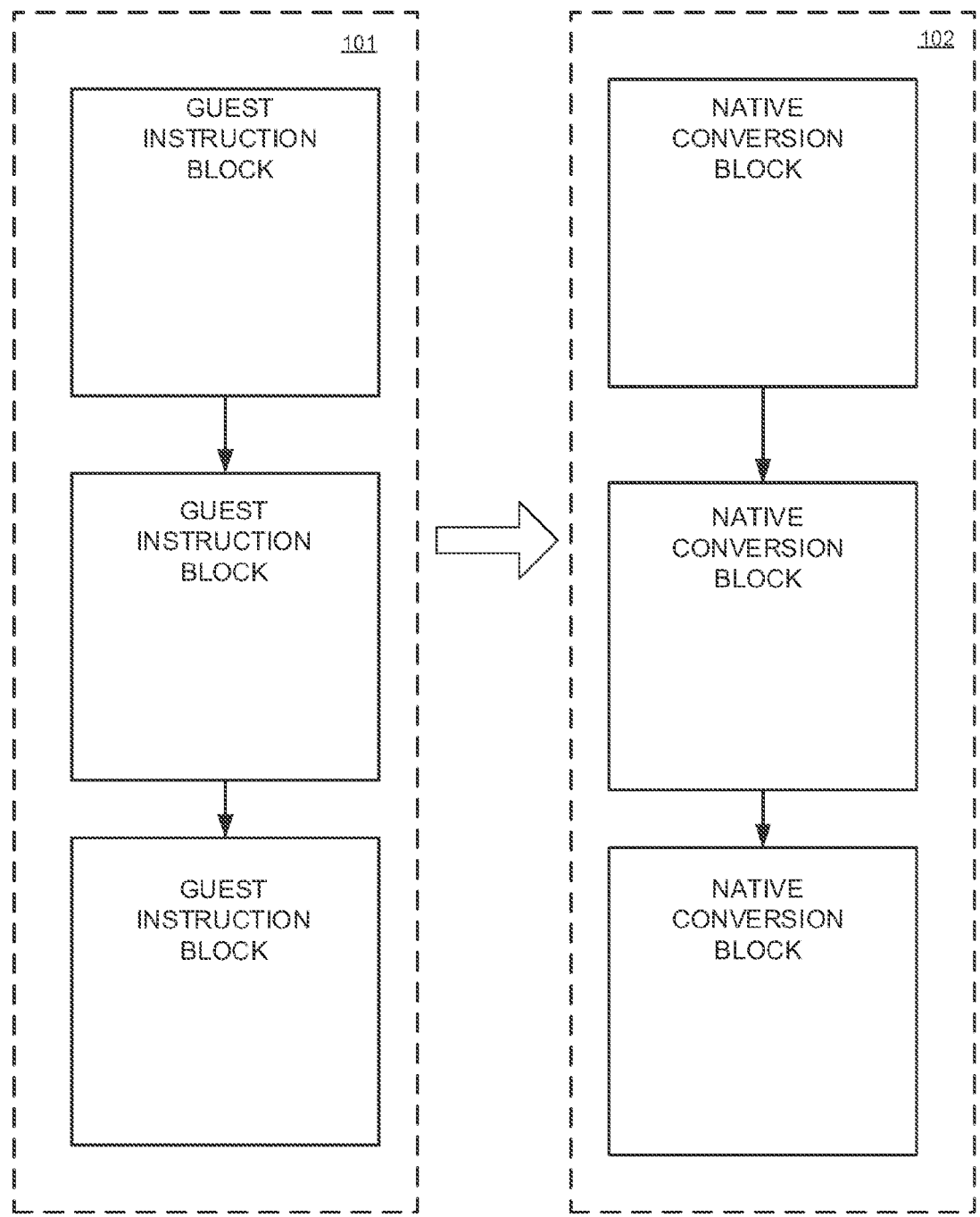
FIG. 1 shows a diagram depicting a block-based translation process where guest instruction blocks are converted to native conversion blocks, in accordance with various embodiments.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. It is noted that any claimed embodiment does not necessarily include all of the "objects" or "embodiments" of the disclosure.

Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result.

The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Reference will now be made in detail to the various embodiments of the present disclosure, examples of which are illustrated in the accompanying drawings. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Embodiments are configured for identifying changes to memory areas that correspond to traces of code stored in a code cache. Embodiments may further be configured for tracking locations of converted code in a code cache. Performance is enhanced while detection of self modifying code and replacement of traces of code in the code cache is performed.

The Figures illustrate example components used by various embodiments. Although specific components are disclosed in the Figures, it should be appreciated that such components are exemplary. That is, embodiments are well suited to having various other components or variations of the components recited in the Figures. It is appreciated that the components in the Figures may operate with other components than those presented, and that not all of the components of the Figures are required to achieve the goals of embodiments.

FIG. 1 shows a diagram depicting a block-based conversion process, where guest instruction blocks are converted to native conversion blocks, in accordance with various embodiments. As illustrated in FIG. 1, a plurality of guest instruction blocks 101 are shown being converted to a corresponding plurality of native conversion blocks 102.

Embodiments of the present invention function by converting instructions of a guest instruction block into corresponding instructions of a native conversion block. Each of the blocks 101 are made up of guest instructions. These guest instructions can be from a number of different guest instruction architectures (e.g., JAVA™ programming language, JAVASCRIPT™ programming scripting language, x86, MIPS, SPARC, etc.). Multiple guest instruction blocks can be converted into one or more corresponding native conversion blocks. This conversion occurs on a per instruction basis.

Figure 2:
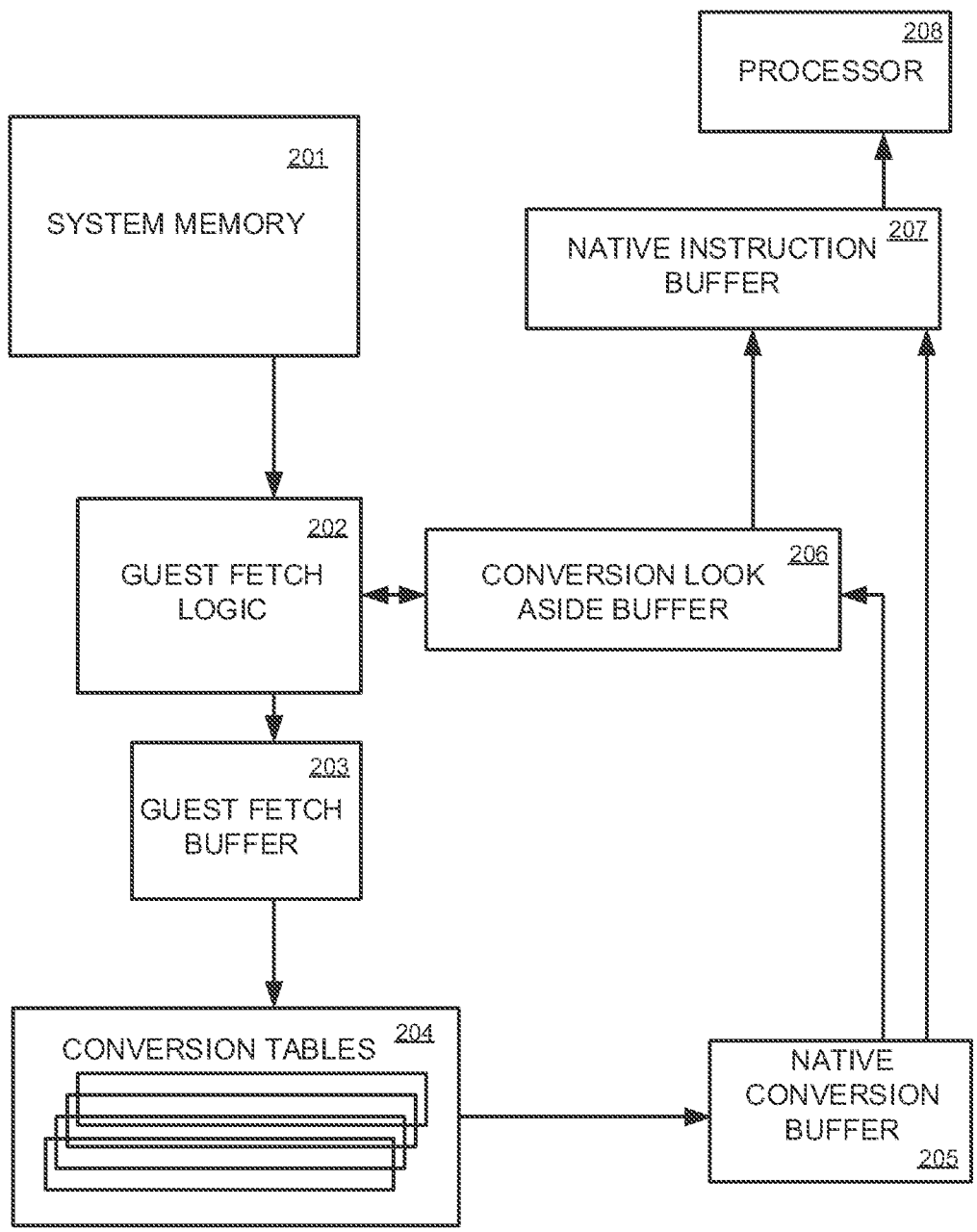
FIG. 2 shows a diagram of an exemplary hardware accelerated conversion system illustrating the manner in which guest instruction blocks and their corresponding native conversion blocks are stored within a cache, in accordance with various embodiments.

FIG. 2 shows a diagram of an exemplary hardware accelerated conversion system 200 illustrating the manner in which guest instruction blocks and their corresponding native conversion blocks are stored within a cache, in accordance with various embodiments. As illustrated in FIG. 2, a conversion look aside buffer (CLB) 206 is used to cache the address mappings between guest and native blocks; such that the most frequently encountered native conversion blocks are accessed through low latency availability to the processor 208.

The FIG. 2 diagram illustrates the manner in which frequently encountered native conversion blocks are maintained within a high-speed low latency cache, the conversion look aside buffer 206. The components depicted in FIG. 2 implement hardware accelerated conversion processing to deliver a much higher level of performance.

The guest fetch logic unit 202 functions as a hardware-based guest instruction fetch unit that fetches guest instructions from the system memory 201. Guest instructions of a given application reside within system memory 201. Upon initiation of a program, the hardware-based guest fetch logic unit 202 starts prefetching guest instructions into a guest fetch buffer 203. The guest fetch buffer 207 accumulates the guest instructions and assembles them into guest instruction blocks. These guest instruction blocks are converted to corresponding native conversion blocks by using the conversion tables 204. The converted native instructions are accumulated within the native conversion buffer 205 until the native conversion block is complete. The native conversion block is then transferred to the native cache 207 and the mappings are stored in the conversion look aside buffer 206. The native cache 207 is then used to feed native instructions to the processor 208 for execution. In one embodiment, the functionality implemented by the guest fetch logic unit 202 is produced by a guest fetch logic state machine.

As this process continues, the conversion look aside buffer 206 is filled with address mappings of guest blocks to native blocks. The conversion look aside buffer 206 uses one or more algorithms (e.g., least recently used, etc.) to ensure that block mappings that are encountered more frequently are kept within the buffer, while block mappings that are rarely encountered are evicted from the buffer. In this manner, hot native conversion blocks mappings are stored within the conversion look aside buffer 206. In addition, it should be noted that the well predicted far guest branches within the native block do not need to insert new mappings in the CLB because their target blocks are stitched within a single mapped native block, thus preserving a small capacity efficiency for the CLB structure. Furthermore, in one embodiment, the CLB 206 is structured to store only the ending guest to native address mappings. This aspect also preserves the small capacity efficiency of the CLB.

The guest fetch logic 202 looks to the conversion look aside buffer 206 to determine whether addresses from a guest instruction block have already been converted to a native conversion block. As described above, embodiments of the present invention provide hardware acceleration for conversion processing. Hence, the guest fetch logic 202 will look to the conversion look aside buffer 206 for pre-existing native conversion block mappings prior to fetching a guest address from system memory 201 for a new conversion.

In one embodiment, the conversion look aside buffer is indexed by guest address ranges, or by individual guest address. The guest address ranges are the ranges of addresses of guest instruction blocks that have been converted to native conversion blocks. The native conversion block mappings stored by a conversion look aside buffer are indexed via their corresponding guest address range of the corresponding guest instruction block. Hence, the guest fetch logic can compare a guest address with the guest address ranges or the individual guest address of converted blocks, the mappings of which are kept in the conversion look aside buffer 206 to determine whether a pre-existing native conversion block resides within what is stored in the native cache 207 or in the code cache of FIG. 3. If the pre-existing native conversion block is in either of the native cache or in the code cache, the corresponding native conversion instructions are forwarded from those caches directly to the processor.

In this manner, hot guest instruction blocks (e.g., guest instruction blocks that are frequently executed) have their corresponding hot native conversion blocks mappings maintained within the high-speed low latency conversion look aside buffer 206. As blocks are touched, an appropriate replacement policy ensures that the hot blocks mappings remain within the conversion look aside buffer. Hence, the guest fetch logic 202 can quickly identify whether requested guest addresses have been previously converted, and can forward the previously converted native instructions directly to the native cache 207 for execution by the processor 208. These aspects save a large number of cycles, since trips to system memory can take 40 to 50 cycles or more. These attributes (e.g., CLB, guest branch sequence prediction, guest & native branch buffers, native caching of the prior) allow the hardware acceleration functionality of embodiments of the present invention to achieve application performance of a guest application to within 80% to 100% the application performance of a comparable native application.

In one embodiment, the guest fetch logic 202 continually prefetches guest instructions for conversion independent of guest instruction requests from the processor 208. Native conversion blocks can be accumulated within a conversion buffer "code cache" in the system memory 201 for those less frequently used blocks. The conversion look aside buffer 206 also keeps the most frequently used mappings. Thus, if a requested guest address does not map to a guest address in the conversion look aside buffer, the guest fetch logic can check system memory 201 to determine if the guest address corresponds to a native conversion block stored therein.

In one embodiment, the conversion look aside buffer 206 is implemented as a cache and utilizes cache coherency protocols to maintain coherency with a much larger conversion buffer stored in higher levels of cache and system memory 201. The native instructions mappings that are stored within the conversion look aside buffer 206 are also written back to higher levels of cache and system memory 201. Write backs to system memory maintain coherency. Hence, cache management protocols can be used to ensure the hot native conversion blocks mappings are stored within the conversion look aside buffer 206 and the cold native conversion mappings blocks are stored in the system memory 201. Hence, a much larger form of the conversion buffer 206 resides in system memory 201.

In one embodiment, the FIG. 2 architecture implements virtual instruction set processor/computer that uses a flexible conversion process that can receive as inputs a number of different instruction architectures. In such a virtual instruction set processor, the front end of the processor is implemented such that it can be software controlled, while taking advantage of hardware accelerated conversion processing to deliver the much higher level of performance. Using such an implementation, different guest architectures can be processed and converted while each receives the benefits of the hardware acceleration to enjoy a much higher level of performance. Example guest architectures include JAVA™ programming language, JAVASCRIPT™ programming scripting language, x86,MIPS, SPARC, etc. In one embodiment, the "guest architecture" can be native instructions (e.g., from a native application/macro-operation) and the conversion process produces optimize native instructions (e.g., optimized native instructions/micro-operations). The software controlled front end can provide a large degree of flexibility for applications executing on the processor. As described above, the hardware acceleration can achieve near native hardware speed for execution of the guest instructions of a guest application.

Tracking Converted Code in the Code Cache

Architectures that employ binary translation to convert guest (e.g., source) code to native (e.g., target) code, in the same or a different Instruction Set Architecture (ISA), have to deal with issues of self-referencing codes, self-modifying codes, and cross code-modification by I/O devices via DMA. Embodiments are configured to handle true and false self modification of guest code and DMA modification of guest code.

When dealing with a situation involving DMA modification of guest code, it is possible to write protect a guest page, from where instructions have been converted and kept in a code cache. However, write protected pages are unable to prevent a copy of the guest code in the code cache from becoming stale due to modification by a DMA device, in systems that do not employ an IOMMU. Further, write protection at guest page granularity has a significant performance impact, if either code is mixed with data in the same page or when a big page is sparsely converted.

Figure 3:
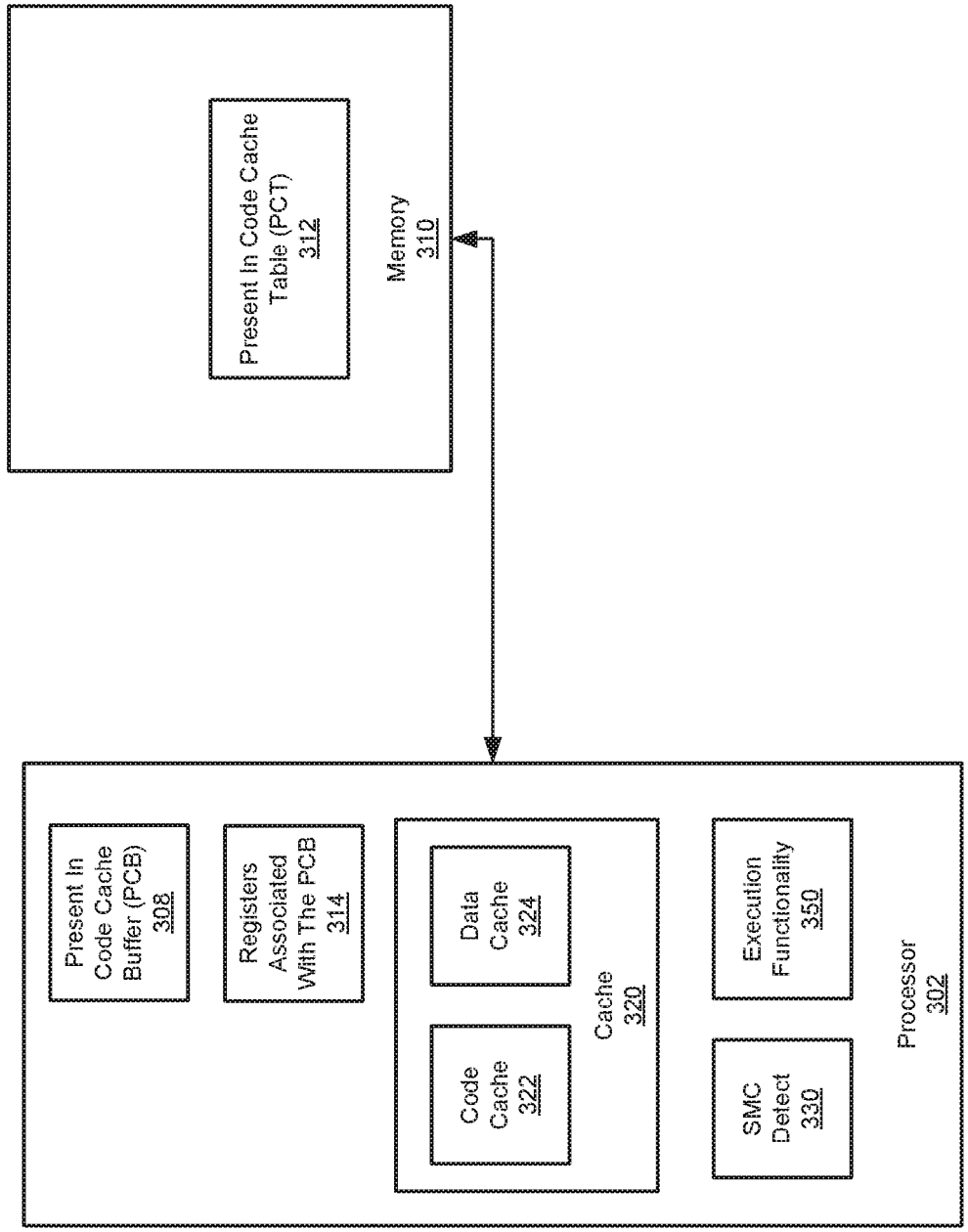
FIG. 3 shows exemplary components of a system for tracking guest code at a granularity smaller than a page size of the system, in accordance with various embodiments.

FIG. 3 shows exemplary components of a system for tracking guest code at a granularity smaller than a page size of the system, in accordance with various embodiments. FIG. 3 depicts components for executing code, executing self modifying code, and maintaining a code cache in response to self modifying code. The system 300 includes a processor 302 and memory 310. It is noted that system 300 may further include other components that are present in other Figures.

The processor 302 is configured to execute programs and/or code that stored in the memory 310. The processor 302 includes a Present in Code Cache Buffer (PCB) 308, PCB associated registers 314, a cache 320, a self-modifying code (SMC) detection module 330, and an execution functionality module 350. The memory 310 includes a Present in Code Cache Table (PCT) 312. The execution functionality module 350 can include one or more processing cores and functionality for fetching instructions.

The SMC detection module 330 is configured to detect and/or determine modification to code by self-modifying code. In some embodiments, the SMC detection module 330 communicates with the execution functionality module 350 to determine when self-modifying code modifies itself.

The execution functionality module 350 is configured to allow the processor 302 to execute programs and/or code accessed from cache 320 and/or the memory 310. The cache 320 includes a code cache 322 and a data cache 324. The code cache 322 is configured to cache code from the memory 310 to increase performance of the processor 302. The data cache 324 is configured to cache data from the memory 310 to increase performance of the processor 302.

In some embodiments, the code cache 322 and the data cache 322 are combined thereby the cache 320 includes code and data stored together. For example, code and data can be interleaved in the cache 320.

Embodiments are configured to track guest code at a granularity smaller than the smallest page size thereby improving tracking and protection of guest code. At this smaller granularity, the size of a cache line for, e.g., the MMU may not be able to trap on stores to converted guest code pages. Embodiments use the Present in Code Cache Table (PCT) 312 to map and track converted code in code cache 322. A store or a DMA write consults the PCT 312 before the store or the DMA write is globally visible.

In some embodiments, to hide memory latency associated with accessing the PCT 312, which is a memory resident structure, a smaller cached version of the PCT 312 is stored on the processor 302 and known as the Present in Code Cache Buffer (PCB) 308. When a store or a DMA write happens to a given page address (PA), an access is performed in the PCB 308. If the access misses in the PCB 308, an access is performed in the PCT 312. In looking up the PCB 308 and/or the PCT 312, if the store is to a cache line which has been converted, an option is provided to raise an exception on the thread/core which executed the store in what is known as the eager method. It is noted that it is possible to steer the exception to a thread/core that is different from the thread/core executing the store by storing the exception target ID of the thread/core in a system register.

In some embodiments, the exception can be raised at a later time, when a guest branch the PCB 308 and/or the PCT 312, in what is known as the lazy method. It is also possible to suppress any exception both on reference and on modification.

Upon a store or a DMA write to a cache line in a page (e.g., 4K page) that has been converted, an entry is added in the PCB 308 and the entry is marked as modified. In some embodiments, stores to data or guest code that have not been converted do not go to the PCT 312 for each store. Access to the PCB 308 upon each store to data or guest code that has not been converted can be avoided if the PCB 308 is sized to map each page (e.g., 4K pages) in a cache (e.g., L2 cache) and the PCB 308 caches PCT 312 hit and miss information in the PCB 308.

The code cache 322 can be a variety of sizes. For example, the guest code can be up to 64 MB in size. In some embodiments, a guest cache line does not have its converted native instructions in the code cache 322, without the guest page (e.g., 4K page) in which the guest cache line belongs, not being mapped in the PCT 312. In other words, a guest cache line will have its converted cache line in the code cache 322 with the guest page in which the guest cache line belongs being mapped in the PCT 312. For example, each 64 byte cache line in the code cache 322 can be from a unique guest code 4K page and with the PCT 312 having 1 million entries (e.g., 64 MB/64 B). The PCT 312 can be sized to allow organization of the code cache 322 in a different number of manners. Table 1 shows the bit layout of an entry in the PCT 312 which is known as a Present in Code cache Table entry (PCTE) (e.g., may be similar to a translation table entry (TTE)).

TABLE 1

Exemplary layout for a PCTE

| Bit index | Field name | Field explanation |
|---|---|---|
| [0] | M | Modified: Indicates that store or DMA write has modified one or many of the guest Code Cache lines, which has Bit index[$i] set to a 1. |
| [7:1] | Reserved | |
| [9:8] | A | Action: 00 - No exception; 01 - Lazy; 10 - Eager; 11 - Lazy and Eager. |
| [73:10] | C | Converted: If C[$i] is a 1, then guest code from cache line at (PA + $i*64) is converted into native code with a copy existing at Code Cache. |
| [101:74] | Tag[y:x] | These bits are the Tag. They represent some of higher order bits of the PA, where y < 40 and x > 11. This is explained in greater detail later. |
| [113:102] | FlexPA | Reserved for future growth in PA. |
| [114] | NS | Non-Secure bit for TrustZone. |
| [115] | V | PCTE valid bit. |
| [127:116] | Meta Data | SW can use this field for any book keeping. |

In some embodiments, multiple PCTEs of the PCT 312 are grouped into a single cache line thereby allowing caching of multiple PCTEs in response to fetching a cache line. For example, four successive PCTEs can be grouped into one 64B cache line and upon fetching the group, the four successive PCTEs are cached into a single L2 cache line. The PCT 312 can be organized in memory as a hash table or a cache that is an N way set associative.

In some embodiments, an entry is inserted into the PCT 312 by software, before inserting an entry into the CLB/CLT to make a conversion visible to a guest branch. The PCT 312 may be maintained by software with hardware setting the modified bit to 1 upon write back from the PCB 308. Updates to the PCT 312 can be handled by a software or hardware or a combination thereof Updates to the PCT 312 can be cached in hardware based caches and the updates by one thread/core is visible to other threads/cores. In some embodiments, logic associated with the PCB 308 updates the modified bit of a PCTE (e.g., a 0 to 1 transition) and software can update each bit of a PCTE. To avoid data corruption by simultaneous update by both hardware and software, the seven higher order bits to the modified bit of a PCTE can be kept as reserved. This allows byte writes by hardware to the modified bits, without colliding with software updates to the same cache line.

The PCB associated registers 314 may include a PCT Tag Register (PCTTR). In some embodiments, the translator or convertor programs the PCTTR register to indicate to hardware (e.g., the processor 302) the tag and index bits of the PCT 312. Table 2 shows exemplary fields of the PCTTR.

TABLE 2

Exemplary fields of the PCTTR

| Bits | Name | Description | Type | Access | Reset |
|---|---|---|---|---|---|
| [11:0] | Reserved | | Cfg | R | 0 |
| [39:12] | PAM | PA Mask of continuous 1 s and 0 s | Cfg | RW | 0 |

In some embodiments, the Page Address Mask (PAM) is configured to not have non-continuous 1s. The PAM field acts as a mask for the page address value found in the PCTE Tag (e.g., as PCTE.Tag[39:12] & PAM[39:12]). For example, if PAM[39:12]=0xFFF_FF00, then PAM[19:12] acts as an index into the PCT 312, while PAM[39:20] are the tag bits in the PCT 312. Thus, when putting a PCTE in the PCT 312, the convertor programs the PAM[39:20] bits in the PCTE.Tag[101:82]. The PCTE.Tag[81:74] bits may be do not care.

The PCB associated registers 314 may include a PCT Configuration Register (PCTCR). GCM as used herein refers to an exception. Table 3 shows exemplary fields of the PCTCR.

TABLE 3

Exemplary fields of the PCTCR

| Bits | Name | Description | Type | Access | Reset |
|---|---|---|---|---|---|
| 0 | SETV | Store Exception Target Valid | Cfg | RW | 0 |
| 7:1 | SET | Store Exception Target | Cfg | RW | 0 |
| 8 | BETV | Branch Exception Target Valid | Cfg | RW | 0 |
| 15:9 | BET | Branch Exception Target | Cfg | RW | 0 |
| 16 | DETV | DMA Exception Target Valid | Info | RW | 1 |
| 23:17 | DET | DMA Exception Target | Cfg | RW | 0 |
| 24 | SEV | Store Exception Valid | Cfg | RW | 1 |
| 25 | BEV | Branch Exception Valid | Cfg | RW | 1 |
| 26 | DEV | DMA Exception Valid | Cfg | RW | 1 |
| 27 | DMAGCMEN | DMA GCM Enable. Enables the participation of DMA in GCM logic. | Cfg | RW | 1 |
| 28 | GCMEN | GCM Enable. Enables GCM logic. | Cfg | RW | 0 |
| 29 | SA | Set Associtivity of PCT. 0: Direct Mapped, 1: 4 ways associative. | Cfg | RW | 0 |

In some embodiments, if the SETV and the BETV are 1, then an exception is raised (in confirmance with the PCTE.A field) on the thread/core programmed in the SET and the BET fields. Otherwise, the exception is raised (in confirmance with the PCTE.A field) on the thread/core from which the store or the branch was executed. In some embodiments, the DETV field is always a 1. An exception is raised (in confirmance with PCTE.A field) on the thread/core programmed in the DET field. If the SEV is zero, no exception is raised on stores. If the BEV is zero, no exception is raised on branches. If DEV is zero, no exception is raised on a DMA access (e.g., a DMA store). If DMAGCMEN is zero, then the logic is allowed to process a DMA access, without having to look up the PCB 308 and/or the PCT 312. If GCMEN is zero, the PCB 308 (e.g., including array and logic) can be powered down.

In some embodiments, the PCB 308 is on chip (e.g., part of the processor 302) and is a thread/core agnostic structure that caches PCTEs of the PCT 312, upon stores and guest branches. The PCB 308 is visible to software through maintenance operations provided via extended system registers.

Using a page address obtained from an MMU, the store looks up an entry in the PCB 308. If the access hits in the PCB 308 and the matching cache line has a C (converted) bit set to a 1, the store will set the $M_n$ ($M_{new}$) to a 1, if the $M_0$ ($M_{old}$) is not already 1.

If the store is a miss in the PCB 308, a PCT walk (PCTW) is initiated to fetch a PCTE from the PCT 312. Upon completing the PCTW, if a matching PCTE was found, the PCTE is installed in the PCB 308 as is, otherwise, a new entry is created in the PCB 308 with C, $M_{new}$, and $M_{old}$ bits set to 0. In the process of installing a PCTE in the PCB 308, a write back may be necessary, if the entry being replaced has the $M_n$ bit set to a 1.

It is noted that loads may not have direct interaction with the PCB 308. However, it is possible to take advantage of locality of reference between loads and stores, by fetching PCTEs for the page (e.g., 4K page) that was accessed recently by a load into the PCB 308.

DMA writes and reads can be routed through to main memory through a processor core of the processor 302. These DMA writes can snoop the PCB 308 to set the M bit and optionally generate an eager exception.

In some embodiments, guest branches look up entries in the CLB and the PCB 308 in parallel (e.g., using the guest physical address obtained from a TLB look up). It is expected that between the CLB, the CLT, the PCB 308, and the PCT 312, there is a consistent view for a given guest physical address. For example, an entry cannot be a hit in CLB/CLT and a miss in the PCT 312 or a hit in the PCT 312 but no C bit set to a 1.

If a guest branch is a miss in the PCB 308, a PCTW is initiated, even if it may be a miss in the CLB.

Upon completion of the PCTW, the PCTE may be installed (e.g., allowing increases in performance for future guest branches to the same target) in the PCB 308. In the process of installing the PCTE in the PCB 308, a write back may be necessitated, if the entry being replaced has the $M_n$ bit set to a 1.

In some embodiments, a guest branch traps or not based on the PCTE.$M_{[new]}$ and PCTE.$M_{[old]}$ of the PCB 308 along with the PCTE.A bits.

Embodiments are configured to support branch instructions. The branch instruction looks up in the PCB 308 and/or the PCT 312 to confirm that the conversion has gone stale due to guest modification. The branch instruction initiates a TLB look up followed by a lookup in the PCB 308 and/or the PCT 312. For example, if the look up results in a miss in the PCB 308, a PCTW is initiated to fetch a PCTE from the PCT 312.

Upon completion of the PCTW, the PCTE may be installed in the PCB 308 (e.g., allowing increases in performance for future branch instructions to the same trace). In the process of installing the PCTE into the PCB 308, a write back may be necessary, if the entry being replaced has the $M_n$ bit set to a 1.

In some embodiments, the PCB 308 stores PCT hit and miss information. This is based on the fact that most stores are either to data or code that has not been converted and such stores will miss in the PCT 312. To avoid performing a PCT look up on most such stores that are expected to miss in the PCT 312, the PCB 308 is used to cache PCT hit and miss information. This allows avoidance of future PCT lookups in response to stores to the same page (e.g., 4K page).

For example, since the PCB 308 is configured to map each possible 4K page that is resident in a L2 cache, the PCB 308 can be configured as a cache with the same number of ways as the L2 cache (e.g., there can be a maximum of 32 4K pages in each way of the L2 cache).

In some embodiments, the PCB 308 is an 8 way associative cache with 32 entries in each way. Each entry provides PCT hit and miss information for a 4K page. The PA[16:12] bits are the index bits to select the set. Table 4 shows a layout of an exemplary PCB entry (PCBE).

TABLE 4

Exemplary layout for a PCB entry

| PCBE.Tag | | | | PCBE.Data | |
|---|---|---|---|---|---|
| V  $M_0$ (e.g., PCTE.M)  $M_n$  PCTE.NS  PA[y:17]* | | | | PCTE.C[63:0]  PCTE.A[1:0] | |

*The value of y can be the same as found in the PCTE.Tag. In a Large Physical Address Extension (LPAE) system that supports up to 40b of address, y is 39.

In some embodiments, the PCB 308 can be maintained through software with system registers. A PCBE can be invalidated based on a PA. For example, when a conversion becomes stale or a new trace is created, software can invalidate an entry in the PCB. A PCBE can be cleaned based on a PA. For example if $M_{old}$ and $M_{new}$ are set and the entry is valid, then the PCBE is written to the memory 310 and the PCT 312 and the PCBE continues to remain valid. This operation allows the convertor to synchronize up the PCTE with the PCBE before any maintenance on the PA in the PCT 312. A PCBE can be cleaned and invalidated based on a PA. For example, if $M_{old}$ and $M_{new}$ are set and the entry is valid, then the PCBE is written to the memory 310 and the PCBE is invalidated. Each PCBE entry can be invalidated during initialization or when the convertor clears the code cache 322. It is noted that modified entries may not be written back to the memory 310 and the PCT 312. Each PCBE can be cleaned and invalidated. For example, this operation allows each modified entry in the PCB 308 to be written back to the PCT 312 and then each entry in the PCB 308 is invalidated.

The PCB associated registers 314 may include a PCB Maintenance Register (PCBMR). Table 5 shows fields of the PCBMR. In some embodiments, if maintenance is index based, PA[16:12] are used as index bits along with the WAY bits.

TABLE 5

Exemplary fields of the PCBMR

| Bits | Name | Description | Type | Access | Reset |
|---|---|---|---|---|---|
| 3:0 | CMD | Command Encoding<br>0 - NOP<br>1 - Invalidate on PA<br>2 - Clean on PA<br>3 - Clean and Invalidate on PA<br>4 - Invalidate on Index, Way<br>5 - Clean on Index, Way<br>6 - Clean and Invalidate on Index, Way<br>7 - Invalidate all<br>8 - Clean and Invalidate all | Cfg | RW | 0 |
| 8:4 | Reserved | | | | 0 |
| 11:9 | WAY | PCB Way | | | |
| 39:12 | PA | PA | Cfg | RW | 0 |

The PCB associated registers 314 may include a PCT Base Address Register (PCTBAR). Table 6 shows fields of the PCTBAR.

TABLE 6

Exemplary fields of the PCTBAR

| Bits | Name | Description | Type | Access | Reset |
|---|---|---|---|---|---|
| 5:0 | Reserved | — | | | 0 |
| 39:6 | PA | BAR PA | Cfg | RW | 0 |

The PCB associated registers 314 may include a GCM Syndrome 0 Register (GCMS0R). Table 7 shows fields of the GCMS0R.

TABLE 7

Exemplary fields of the GCMS0R

| Bits | Name | Description | Type | Access | Reset |
|---|---|---|---|---|---|
| 39:0 | PA | Store, Load or DMA PA that triggered GCM Exception. | Cfg | RW | 0 |
| 40 | NS | PCTE.NS | Cfg | RW | 0 |
| 42:41 | A | PCTE.A | Cfg | RW | 0 |

The PCB associated registers 314 may include a GCM Syndrome 1 Register (GCMS1R). Table 8 shows fields of the GCMS1R.

TABLE 8

Exemplary fields of the GCMS1R

| Bits | Name | Description | Type | Access | Reset |
|---|---|---|---|---|---|
| 63:0 | C | PCTE.C | Cfg | RW | 0 |

Embodiments are configured to handle corners cases using a variety of techniques including, but not limited to, breaking a trace on Guest Instruction Branch (GIB) interaction, PCT maintenance, and PCB prefetching.

In some embodiments, a guest branch is used to detect stale code in the code cache. The convertor breaks a trace upon encountering a guest branch and continues with a single trace.

In some embodiments, the PCT 312 is maintained by software using loads and stores. Logic of the PCB 308 can write back a modified PCBE to the PCT 308.

In some embodiments, each PCBE maps to a 4K page. If bigger guest page sizes are employed, PCB logic can sequentially prefetch the PCTE for the next sequential 4K page, for each load or store reference that hits in the PCB 308.

With reference to FIG. 4, flowchart 400 illustrates example functions used by various embodiments for protecting data, as described herein. Although specific function blocks ("blocks") are disclosed in flowchart 400, such steps are exemplary. That is, embodiments are well suited to performing various other blocks or variations of the blocks recited in flowchart 400. It is appreciated that the blocks in flowchart 400 can be performed in an order different than presented, and that not all of the blocks in flowchart 400 need be performed.

Figure 4A:
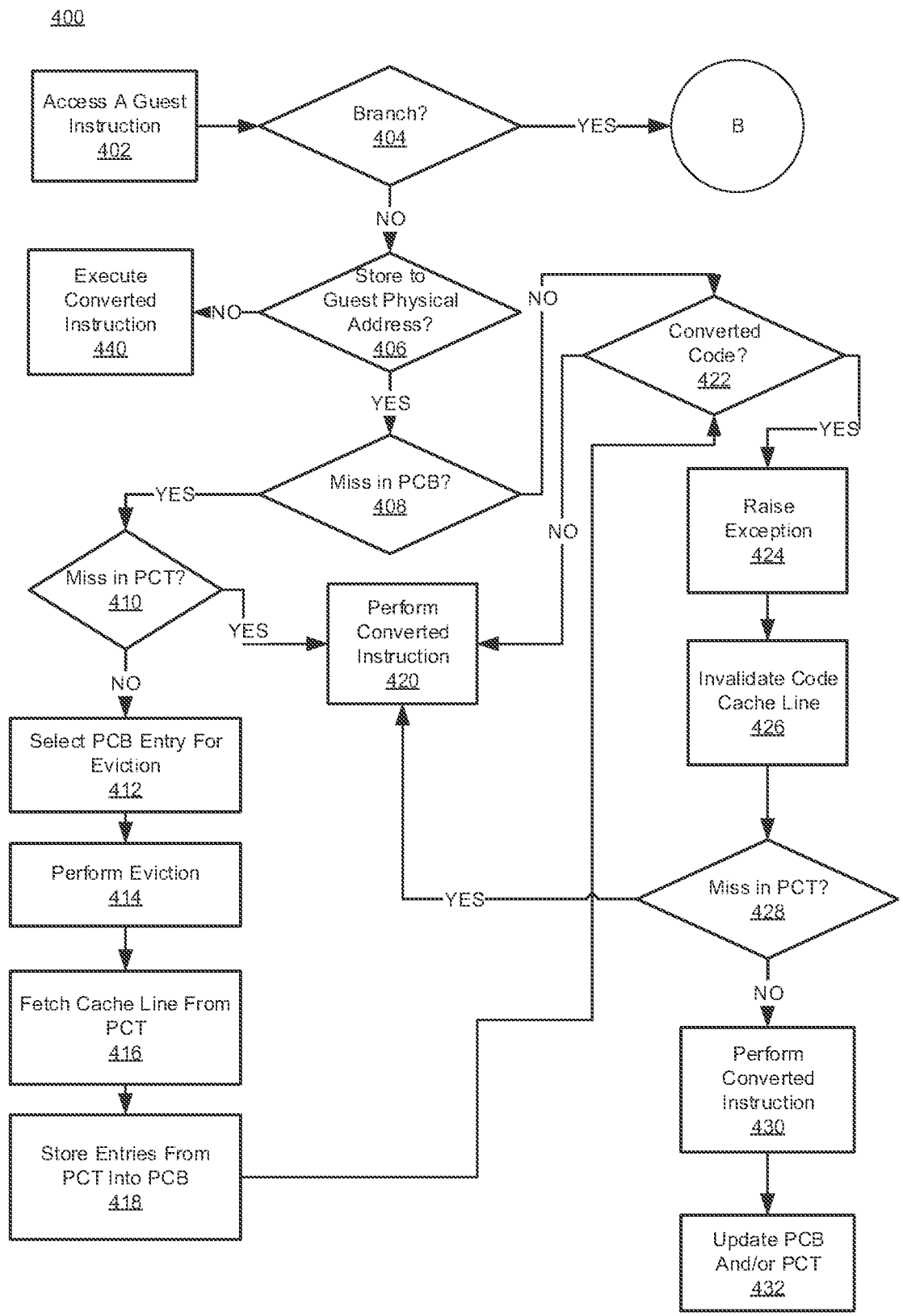
FIGS. 4A-B show a flowchart of an exemplary electronic component controlled process for tracking location of converted code in a code cache, in accordance with various embodiments.
Figure 4B:
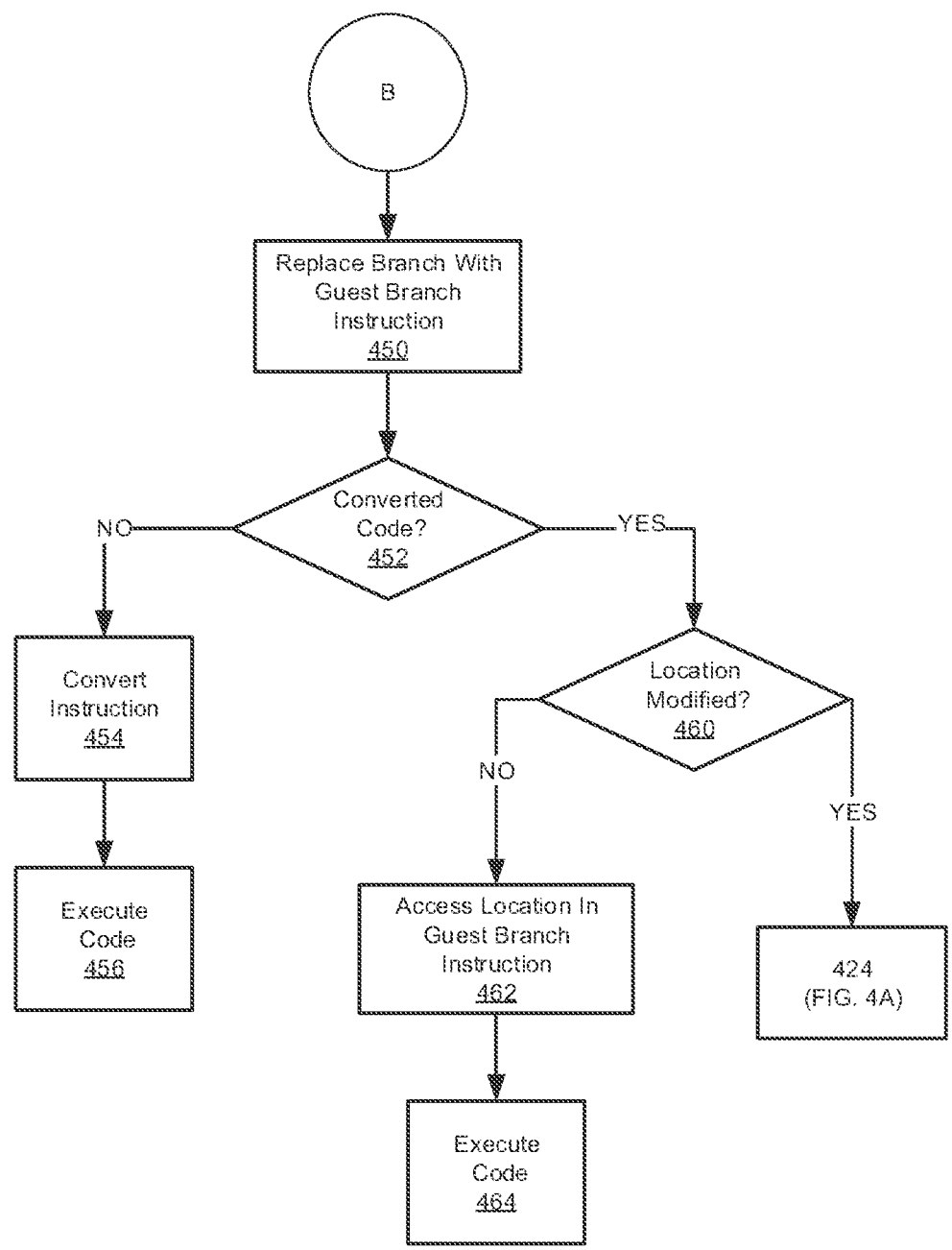

FIGS. 4A-B show a flowchart of an exemplary electronic component controlled process for tracking locations of converted code in a code cache, in accordance with various embodiments. FIGS. 4A-B depict a process 400, with respect to some embodiments, for tracking whether converted code is in a code cache with a PCB and PCT, as described herein. It is appreciated that while the process 400 is described with respect to a PCB and a PCT, the process 400 may be performed with other data structures and configurations with similar functionality.

At block 402, a guest instruction is accessed. In some embodiments, the guest instruction is accessed by a translator that converts guest instructions to native instructions, as described herein.

At block 404, whether the guest instruction is a branch is determined. If the guest instruction is not a branch instruction, block 406 is performed. If the guest instruction is a branch instruction, block 450 is performed.

At block 406, whether the guest instruction is a store to a guest physical address is determined. If the guest instruction is a store to a guest physical address, block 408 is performed. If the guest instruction is not a store to a guest physical address, block 440 is performed.

At block 408, whether there is a miss in the PCB is determined. A miss in the PCB can be determined based on the page or address of the guest instruction. If there is a miss in the PCB, block 410 is performed. If there is not a miss in the PCB, block 422 is performed.

At block 410, whether there is a miss in the PCT is determined. A miss in the PCT can be determined based on the page or address of the guest instruction. If there is a miss in the PCT, block 420 is performed. If there is not a miss in the PCT, block 412 is performed.

At block 412, a PCB entry is selected for eviction. The selection of a PCB entry for eviction can be based on a least recently used basis, as described herein.

At block 414, the eviction of the selected PCB entry is performed. At block 416, a cache line sized selection from the PCT is fetched. As described herein, the cache line sized selection can include multiple PCT entries (e.g., four PCTEs).

At block 418, an entry from the PCT is stored into the PCB (e.g., into the location of the evicted PCB entry).

At block 420, the converted guest instruction is performed. In some embodiments, the code cache is updated as part of the guest instruction conversion. Block 402 may then be performed for the next guest instruction.

At block 422, whether the location has converted code is determined, as described herein. If the location has converted code, block 424 is performed. If the location does not have converted code, block 420 is performed.

At block 424, an exception is raised, as described herein. This may be known as the eager method. In some embodiments, an exception is not raised. In some embodiments, when the exception is raised, code conversion is halted to allow updating of the code cache and/or accessing of memory, among other things.

At block 426, the code cache line associated with the address in the guest instruction is invalidated. For example, the invalidation can be based on the code cache line being determined to be stale based modification indicators of the PCB and/or the PCT, as described herein.

At block 428, whether there is a miss in the PCT is determined. A miss in the PCT can be determined based on the page or address of the guest instruction. If there is a miss in the PCT, block 420 is performed. If there is not a miss in the PCT, block 430 is performed.

At block 430, the guest instruction is converted. In some embodiments, the code cache is updated as part of the guest instruction conversion.

At block 432, the PCB and/or the PCT is updated, as described herein, to reflect the performance of the store instruction to a guest physical address and associated location in the code cache. For example, the PCB and/or PCT may be updated to reflect that the request has modified a code cache line. Block 402 may then be performed for the next guest instruction.

At block 440, a converted instruction based on the guest instruction is executed. Block 402 may then be performed for the next guest instruction.

Referring to FIG. 4B, at block 450, the branch instruction is replaced with a guest branch instruction.

At block 452, whether the location has converted code is determined, as described herein. If the location has converted code, block 460 is performed. If the location does not have converted code, block 454 is performed.

At block 454, the guest branch instruction is converted (e.g., to a native branch instruction). At block 456, code at the location of the converted guest branch instruction is executed.

At block 460, whether the location (e.g., address) of the guest branch instruction has been modified is determined. Whether the contents of the location of the guest branch instruction has been modified is determined based on accessing the PCB and/or PCT. If the contents of the location have been modified, block 424 of FIG. 4A is performed. This may be known as the lazy method. If the contents of the location have not been modified, block 462 is performed.

At block 462, the location of the guest branch instruction is accessed. The location may be accessed from the code cache or memory.

At block 464, the code at the location of the guest branch instruction is executed.

Figure 5:
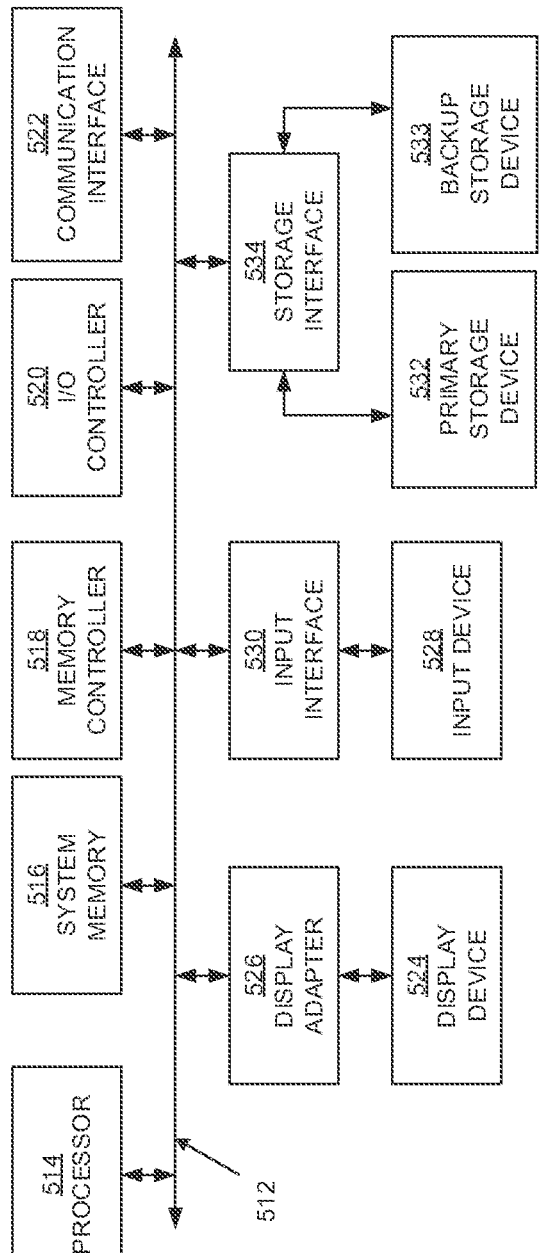
FIG. 5 is a block diagram of an exemplary computing system including various embodiments.

FIG. 5 is a block diagram of an exemplary computing system 500 including various embodiments. Computing system 500 broadly represents any single or multi-processor computing device or system capable of executing computer-readable instructions. Examples of computing system 500 include, without limitation, workstations, laptops, client-side terminals, servers, supercomputers, distributed computing systems, handheld devices, or any other computing system or device. In its most basic configuration, computing system 500 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the example embodiments described and/or illustrated herein. For example, processor 514 may perform and/or be a means for performing, either alone or in combination with other elements, one or more of the identifying, determining, using, implementing, translating, tracking, receiving, moving, and providing described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, RAM, ROM, FLASH memory, or any other suitable memory device. Although not required, in certain embodiments computing system 500 may include both a volatile memory unit (such as, for example, system memory 516) and a non-volatile storage device (such as, for example, primary storage device 532.

Computing system 500 may also include one or more components or elements in addition to processor 514 and system memory 516. For example, in the embodiment of FIG. 5, computing system 500 includes a memory controller 518, an I/O controller 520, and a communication interface 522, each of which may be interconnected via a communication infrastructure 512.

Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network. In one embodiment, system memory 516 communicates via a dedicated memory bus.

Memory controller 518 generally represents any type or form of device capable of handling memory or data or controlling communication between one or more components of computing system 500. For example, memory controller 518 may control communication between processor 514, system memory 516, and I/O controller 520 via communication infrastructure 512. Memory controller may perform and/or be a means for performing, either alone or in combination with other elements, one or more of the operations or features described herein.

I/O controller 520 generally represents any type or form of module capable of coordinating and/or controlling the input and output functions of a computing device. For example, I/O controller 520 may control or facilitate transfer of data between one or more elements of computing system 500, such as processor 514, system memory 516, communication interface 522, display adapter 526, input interface 530, and storage interface 534. I/O controller 520 may be used, for example, to perform and/or be a means for performing, either alone or in combination with other elements, one or more of the operations described herein. I/O controller 520 may also be used to perform and/or be a means for performing other operations and features set forth in the instant disclosure.

Communication interface 522 broadly represents any type or form of communication device or adapter capable of facilitating communication between example computing system 500 and one or more additional devices. For example, communication interface 522 may facilitate communication between computing system 500 and a private or public network including additional computing systems. Examples of communication interface 522 include, without limitation, a wired network interface (such as a network interface card), a wireless network interface (such as a wireless network interface card), a modem, and any other suitable interface. In one embodiment, communication interface 522 provides a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

Communication interface 522 may also represent a host adapter configured to facilitate communication between computing system 500 and one or more additional network or storage devices via an external bus or communications channel. Examples of host adapters include, without limitation, SCSI host adapters, USB host adapters, IEEE (Institute of Electrical and Electronics Engineers) 594 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 522 may also allow computing system 500 to engage in distributed or remote computing. For example, communication interface 522 may receive instructions from a remote device or send instructions to a remote device for execution. Communication interface 522 may perform and/or be a means for performing, either alone or in combination with other elements, one or more of the operations disclosed herein. Communication interface 522 may also be used to perform and/or be a means for performing other operations and features set forth in the instant disclosure.

As illustrated in FIG. 5, computing system 500 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 500 may also include at least one input device 528 coupled to communication infrastructure 512 via an input interface 530. Input device 528 generally represents any type or form of input device capable of providing input, either computer- or human-generated, to computing system 500. Examples of input device 528 include, without limitation, a keyboard, a pointing device, a speech recognition device, or any other input device. In one embodiment, input device 528 may perform and/or be a means for performing, either alone or in combination with other elements, one or more of the operations disclosed herein. Input device 528 may also be used to perform and/or be a means for performing other operations and features set forth in the instant disclosure.

As illustrated in FIG. 5, computing system 500 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state disk, a floppy disk drive, a magnetic tape drive, an optical disk drive, a FLASH drive, or the like. Storage interface 534 generally represents any type or form of interface or device for transferring data between storage devices 532 and 533 and other components of computing system 500.

Continuing with reference to FIG. 5, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a FLASH memory device, or the like. Storage devices 532 and 533 may also include other similar structures or devices for allowing computer software, data, or other computer-readable instructions to be loaded into computing system 500. For example, storage devices 532 and 533 may be configured to read and write software, data, or other computer-readable information. Storage devices 532 and 533 may also be a part of computing system 500 or may be separate devices accessed through other interface systems.

Storage devices 532 and 533 may be used to perform, and/or be a means for performing, either alone or in combination with other elements, one or more of the operations disclosed herein. Storage devices 532 and 533 may also be used to perform, and/or be a means for performing, other operations and features set forth in the instant disclosure.

Many other devices or subsystems may be connected to computing system 500. Conversely, all of the components and devices illustrated in FIG. 5 need not be present to practice the embodiments described herein. The devices and subsystems referenced above may also be interconnected in different ways from that shown in FIG. 5. Computing system 500 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 500. All or a portion of the computer program stored on the computer-readable medium may then be stored in system memory 516 and/or various portions of storage devices 532 and 533. When executed by processor 514, a computer program loaded into computing system 500 may cause processor 514 to perform and/or be a means for performing the functions of the example embodiments described and/or illustrated herein. Additionally or alternatively, the example embodiments described and/or illustrated herein may be implemented in firmware and/or hardware. For example, computing system 500 may be configured as an ASIC adapted to implement one or more of the embodiments disclosed herein.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. An apparatus comprising:
a memory;
a hardware buffer; and
a processor, including a set of cores, wherein the processor is configured to:
convert guest code to native code;
store converted guest code into a code cache portion of the processor;
maintain the hardware buffer configured for tracking respective locations of converted code in a code cache, wherein the hardware buffer is updated based on a respective access to a respective location in the memory associated with a respective location of converted guest code in the code cache; and
perform a request to modify the respective location in the memory associated with the respective access after accessing the hardware buffer, wherein the processor is configured to raise an exception if the request is to modify a location in memory associated with a location in the code cache that comprises converted guest code and wherein the memory comprises a table associated with the hardware buffer for tracking converted code present in the code cache, including tracking modifications to guest code, a type of exception to take in response to modifications to guest code, and whether the guest code has been converted to native code.

2. The apparatus of claim 1, wherein the hardware buffer is configured to act as a cache of the table associated with the hardware buffer and the hardware buffer comprises a subset of data of the table associated with the hardware buffer.

3. The apparatus of claim 1, wherein the processor is configured to raise an exception in response to a guest code branch.

4. The apparatus of claim 1, wherein the request is a store by self modifying code.

5. The apparatus of claim 1, wherein the request is a direct memory access (DMA) write.

6. The apparatus of claim 1, wherein the processor comprises the hardware buffer.

7. A system comprising:
a memory, and;
a processor comprising a hardware buffer, a code cache, and a set of cores, wherein the processor is configured to:
convert guest code to native code;
store converted guest code into a code cache in the processor; and
maintain the hardware buffer configured for tracking respective locations of converted code in a code cache, wherein the hardware buffer is updated based on a respective access to a respective location in the memory associated with a respective location of converted guest code in the code cache; maintain a table associated with the hardware buffer for tracking converted code present in the code cache, wherein the memory comprises the table associated with the hardware buffer; and
perform a request to modify the respective location in the memory associated with the respective access after accessing the hardware buffer, wherein the processor is configured to raise an exception if the request is to modify a location in memory associated with a location in the code cache that comprises converted guest code and wherein the memory comprises a table associated with the hardware buffer for tracking converted code present in the code cache, including tracking modifications to guest code, a type of exception to take in response to modifications to guest code, and whether the guest code has been converted to native code.

8. The system of claim 7, wherein the hardware buffer is configured to act as a cache of the table associated with the hardware buffer and the hardware buffer comprises a subset of data of the table associated with the hardware buffer.

9. The apparatus of claim 7, wherein the processor is configured to raise an exception in response to a guest code branch.

10. The apparatus of claim 7, wherein the request is a store by self modifying code.

11. The apparatus of claim 7, wherein the request is a direct memory access (DMA) write.

12. A system for converting guest code, the system comprising:
   a memory, and;
   a processor comprising a hardware buffer, a code cache, and a set of cores, wherein the processor is configured to:
      convert guest code to native code;
      store converted guest code into a code cache in the processor; and
      maintain the hardware buffer configured for tracking respective locations of converted code in a code cache, wherein the hardware buffer is updated based on a respective access to a respective location in the memory associated with a respective location of converted guest code in the code cache, and wherein the hardware buffer is updated in response to self modifying code;
      maintain a table associated with the hardware buffer for tracking converted code present in the code cache, wherein the memory comprises the table associated with the hardware buffer; and
      perform a request to modify the respective location in the memory associated with the respective access after accessing the hardware buffer wherein the processor is configured to raise an exception if the request is to modify a location in memory associated with a location in the code cache that comprises converted guest code and wherein the memory comprises a table associated with the hardware buffer for tracking converted code present in the code cache, including tracking modifications to guest code, a type of exception to take in response to modifications to guest code, and whether the guest code has been converted to native code.

13. The system of claim 12, wherein the hardware buffer is configured to act as a cache of the table associated with the hardware buffer and the hardware buffer comprises a subset of data of the table associated with the hardware buffer.

14. The system of claim 12, wherein the processor is configured to raise an exception in response to a guest code branch.

15. The system of claim 12, wherein the request is a store.

16. The system of claim 12, wherein the request is a direct memory access (DMA) write.

* * * * *